(No Model.) 2 Sheets—Sheet 1.
W. LYMAN.
CLAMPING OPERATING HANDLE FOR ADJUSTING SCREWS.
No. 395,985. Patented Jan. 8, 1889.
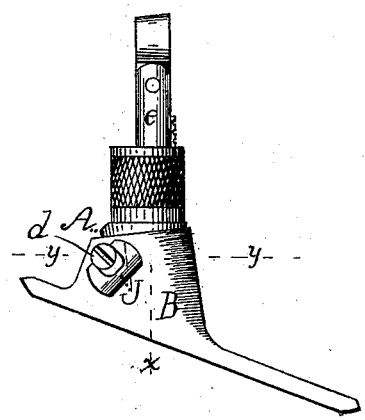
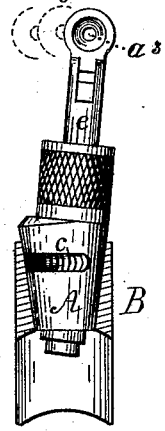
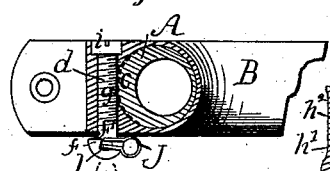
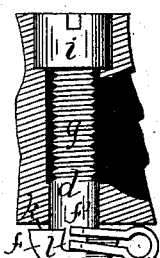
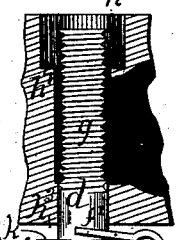
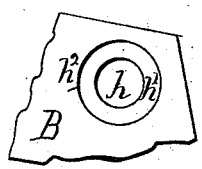
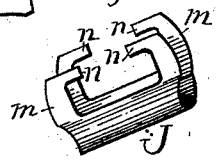
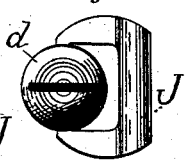
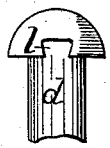
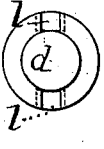
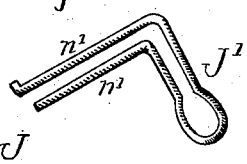
WITNESSES:
Lucius A. Robinson
Mary E. Barnes
INVENTOR
William Lyman
BY George L. Barnes
ATTORNEYS
N. PETERS, Photo-Lithographer, Washington, D. C.

(No Model.) 2 Sheets—Sheet 2.
W. LYMAN.
CLAMPING OPERATING HANDLE FOR ADJUSTING SCREWS.
No. 395,985. Patented Jan. 8, 1889.
Fig. 19
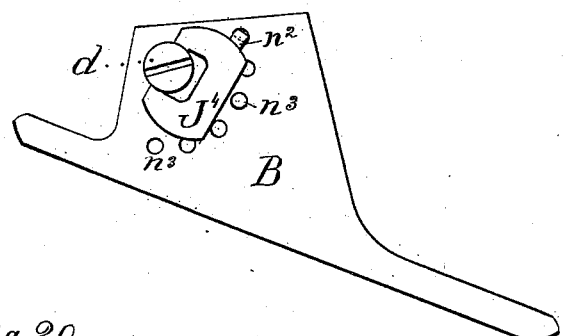
Fig. 20
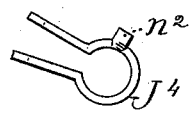
Fig. 21
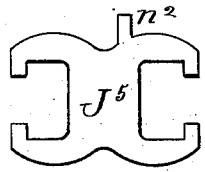
Fig. 22 Fig. 23
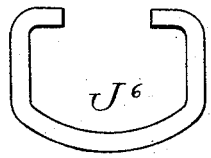 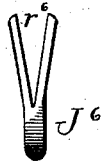
Fig. 24
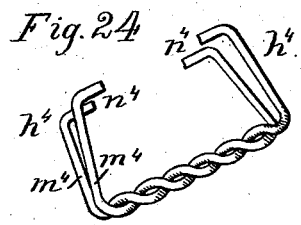
Fig. 25
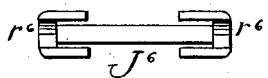
Fig. 26
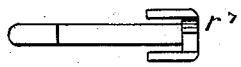
WITNESSES:
Lucius A. Robinson
Mary E. Barnes
INVENTOR
William Lyman
BY George L. Barnes
ATTORNEYS

UNITED STATES PATENT OFFICE.

WILLIAM LYMAN, OF MIDDLEFIELD, CONNECTICUT.

CLAMPING OPERATING-HANDLE FOR ADJUSTING-SCREWS.

SPECIFICATION forming part of Letters Patent No. 395,985, dated January 8, 1889.

Application filed July 10, 1888. Serial No. 279,516. (No model.)

*To all whom it may concern:*

Be it known that I, WILLIAM LYMAN, of the town of Middlefield, in the State of Connecticut, have invented certain new and useful Improvements in Clamping Operating-Handles for Adjusting-Screws, of which the following is a specification.

My invention relates to a combined operating-handle and holding-clamp for an adjusting-screw, and is particularly adapted for use upon screws or threaded arbors which are journaled in fixed bearings and engaged with movable nuts or worm-wheels for the purpose of adjusting parts of mechanism in different positions and securely fastening them in place.

The device may be used on any adjusting screw or arbor which requires to be firmly held where set—such as the thumb-screws of mathematical instruments, the adjusting-screws of machines, or arbors of dials—and may be employed as a nut-lock for screws which do not adjust mechanism, but require to be occasionally turned or removed.

In this specification my invention is shown and described as applied to a wind-gage sight for fire-arms for the purpose of adjusting the sight laterally to compensate for the effect of wind upon the projectile; but I am aware that it may be employed for many other purposes. The sight here referred to forms the subject of United States Letters Patent No. 368,598, which were granted to me on August 23, 1887; and the object of the invention in this particular case is to provide an operating-handle for the lateral adjusting-screw which may be folded down against the base of the sight, so as not to project, and thereby incur the liability of being accidentally disarranged, and, also, which shall be adapted, when thus folded down, to form a spring holding or locking clamp which will securely hold the screw stationary in any position.

The invention consists in a novel folding spring having its ends inserted in the screw head or flange in such manner as to exert their pressure longitudinally on the screw and thrust a friction-collar thereon against a fixed part of the mechanism when the spring is folded down, and adapted when not folded down to serve as an operating head or handle without exerting any frictional effect on the screw, all as hereinafter more particularly described and claimed.

In the accompanying drawings, forming a part of this specification, Figure 1 shows a wind-gage sight in side elevation having my improved operating clamp-handle on the lateral adjusting-screw. Fig. 2 is a front elevation of the same with the base cut in vertical section on the line *x*, Fig. 1. Fig. 3 is a horizontal section on the line *y y*, Fig. 1. Fig. 4 is an enlarged view of the adjusting-screw shown in a section on the line *y y*, Fig. 1, of the base and with the folding clamping-handle in position for turning the screw. Fig. 5 is a similar view showing the clamping-handle folded down in position to clamp the screw in place. Fig. 6 is a similar view to Fig. 5, but having the friction nut or collar removed to show the spring in uncompressed position. Fig. 7 is a side elevation of a portion of the base, viewed from the side opposite to that shown in Fig. 1, showing the journals of the adjusting-screw. Fig. 8 is a perspective view of the operating clamp-handle detached from the screw. Fig. 9 is an end view of the operating handle and screw, viewed from the end opposite the screw-head and with the handle in the unclamped position. Fig. 10 is a view similar to Fig. 9, but with the operating-handle in clamping position. Fig. 11 is similar to the preceding figure, but viewed from the opposite direction and having the handle turned down on the opposite side. Fig. 12 is a side view of a part of the adjusting-screw with the operating-handle removed. Fig. 13 is an end view of Fig. 12. Figs. 14 and 15 are similar to the two preceding figures, but show a screw having the spring-recesses slightly modified in construction. Fig. 16 shows a spring operating-handle of modified construction. Fig. 17 is an end view of a bolt with the operating-handle of the preceding figure. Fig. 18 shows my improvement adapted as a nut-lock and applied to the nut instead of the screw-head. Fig. 19 shows a device for positively locking the handle, and Fig. 20 is an end view of the spring shown in Fig. 19. Fig. 21 is a spring-blank; and Figs. 22, 23, 24, 25, and 26 show different modifications of the operating-handle.

A full description of the sight shown in the annexed drawings may be found in the Letters Patent No. 368,598, above referred to; but it may be briefly described here as follows:

A conical eccentric, A, is journaled in the base B of the sight, and a circular rack, c, is cut on the forward side of the eccentric and is intermeshed with an adjusting screw or worm, d, which is also journaled in the base and suitably secured from longitudinal movement, so that as it is revolved it turns the conical eccentric in the base. The sight-post e and its elevating mechanism are mounted in the eccentric at an angle to its axis, and it is therefore moved lateral to a vertical plane through the axis of the gun-barrel as it is revolved, because it describes a conical path, and the movement of the sight-aperture $a^3$ provides for "wind-gage." It is particularly essential that the head of the operating-screw d shall not project sufficiently to engage twigs and other objects which are liable to come in contact with a gun in ordinary usage, and also that the screw shall in no wise be liable to be accidentally turned to derange the wind-gage when it is ascertained, all of which features are admirably secured by the herein-described improvements.

Referring to the drawings, d denotes the adjusting-screw, which is inserted transversely through the base B forward of the conical eccentric A, and has a journal, $f'$, between the head f and the thread g, fitting freely in a corresponding circular hole, h, in that side of the base. Concentric with the hole h on the opposite side of the base is a larger hole, $h^2$, having an annular shoulder, $h'$, at the bottom where it joins the smaller hole, h, and a nut or collar, i, is screwed tightly on the end of the screw and fitted into this bearing, thus forming a journal for that end of the screw. The inner face of the nut, fitting against the shoulder $h'$ at the bottom of the bearing, and the face k under the head of the screw, fitting against the side $h^3$ of the base, form shoulders to hold the screw in position endwise. The thread g of the screw is of ordinary construction, and it intermeshes with the teeth in the rack c of the conical eccentric A in the usual manner, as shown in Fig. 3. In some mechanisms the screw will be engaged with a movable nut instead of a worm, and it will be understood that the form of the screw may be modified to adapt it to the different classes of machinery, the only essentials being that it shall be suitably journaled and provided with a frictional thrust-collar to co-operate with the clamping spring operating-handle.

On the under side of the head or flange f of the screw are two opposite radial slots or recesses, l, which extend from the periphery of the head inward toward the body of the screw. They are preferably made of dovetailed form or other shape which has its least width at the face of the screw-head. The dovetailed form is shown in Figs. 4, 5, 6, 9, 10, 11, 12, and 13, and Figs. 14 and 15 show a circular recess, $l^3$, which is made by drilling entirely through the bolt and then milling away the face of the head until it intersects with the recess. Such recess will be analogous to a dovetailed slot. The recesses may be simply rectangular, as shown in Fig. 18; but the other forms are preferable.

J represents the folding and clamping operating-handle, which consists, substantially, of a loop or U-shaped spring of flat strip metal, having each leg or part m of the loop cut away, forked, or bifurcated to pass over the head of the screw, and formed with an inwardly-extending prong or toe, n, at each end of each fork, adapted to be received in the recesses l in the head of the screw. This construction forms, practically, two loop or U springs or elastic forks arranged parallel and coincident, one upon each side of the screw-head, joined by a tie or connecting-web, and each having its ends extended inward parallel with each other and toward the opposite spring, these ends being received in the recesses in the screw-head and on which the handle swings. If the prongs n on one loop are made sufficiently long, the other loop may be dispensed with, and in such case the loop could readily be made of wire, as shown by $J'$ in Fig. 16, and having one of its prongs, $n'$, passed clear through the bolt-head and slightly turned over on the end the better to hold the spring in place; but the double loop J, made of flat spring material bent into a loop and cut away to receive the screw-head, is preferable.

The ends of the spring J—that is, the inwardly-projecting prongs n—may readily be inserted in the recess in the screw-head by laying the spring in its folded-down position, as shown in Fig. 6, and pushing the screw into its journals in the base, when by turning on the nut i on the end of the screw the spring will be compressed into place, as shown in Fig. 5. The spring will then be in operation, as shown in Figs. 1, 3, and 5, and exert its force between the head of the screw and the face $h^3$ of the base B, thereby pressing the face of the friction collar or nut l against its seat $h'$ in the base and imposing sufficient friction thereon to hold the screw against any derangement that it would ordinarily be subject to.

It will readily be understood that when the operating-handle J is swung up away from the base the prongs n turn in the recesses in the screw the same as if they were journals, and when the handle is brought up into the plane of the screw, as shown in Fig. 4—that is, vertical to the plane of the screw-head— the prongs will simply press against the side of the recess and not exert any pressure tending to clamp the screw. The screw will then be perfectly free to turn in its journals, and the folding spring, when in that position, forms an admirable head or handle by which the rotation of the screw may be conveniently accomplished. The object of forming the recesses l of dovetailed shape is to prevent any liability of the prongs n from dropping out from the recesses if there should be enough play between the screw-head and base to permit this. With the recesses made most narrow at the face of the head f the spring-handle will not fall out of them when folded up into position to act as a handle, even if the screw is taken out of its bearings.

The folding spring J will impose an endwise thrust on the screw whichever side of the head it may be folded down upon, for it will be seen that so long as the spring lies down in the plane of the head of the screw one pair of the prongs n will press against the upper sides of the recesses and the opposite pair of prongs will rest against the base of the sight, and thus the screw will be forced endwise. In order to prevent the prongs n from wearing the face of the base, that portion of the surface upon the base where they bear around the hole h may be case-hardened, or a thin hardened washer may be placed on the screw between the prongs n and face of the base to form a bearing for the prongs and resist abrasion.

It is sometimes very convenient to have the spring adapted to be folded down upon either side of the screw-head—as, for instance, in the sight shown the screw is arranged near the edge of the base, and if the spring only folded one way it would sometimes come in a position not over the base, but projecting therefrom and in an unprotected position. A graduated scale may be marked on the base, if required, to denote the number of degrees through which the screw is turned, or, if it is desired to positively lock the operating-handle, it may be formed with a projection or stop, $n^2$, on one side, as shown in Figs. 19, 20, and 21, bent down below the body of the spring $J^4$ and adapted to enter suitable cavities, $n^3$, in the base of the sight or fixed part of whatever mechanism the screw is applied to. Fig. 21 shows the form of a blank, $J^5$, cut out to form the spring by being afterward bent into shape, and the locking-stop $n^2$ is also shown in that figure; but ordinarily the blank will be made without the stop.

It will be understood that the shape and also the construction of the spring-handle may be varied somewhat without departing from the nature of my invention. It may be made of a piece of spring wire or rod, $J^6$, bent into the shape shown in Fig. 22, and then having each end split or sawed down to form a spring-fork, $r^6$, as shown in Figs. 23 and 25, which are respectively end and plan views of Fig. 22; or, if desired, one end only of the wire may be split, as shown in Fig. 26, which forms a single fork or loop, $r^7$, on one side of the screw-head, the other end of the wire serving as a journal and also holding the device in place. The spring may also be made by twisting two wires, $m^4$, together and bending their ends around, as shown in Fig. 24, to form the elastic loops $h^4$ and the inwardly-projecting prongs $n^4$. The form of the journals and bearings of the adjusting-screw may also be varied without changing the nature of my invention.

The screw here shown is best for the purpose intended—that is, for adjusting-screws of this class of sights; but in machinery the adjusting-screw will frequently be journaled in half-boxes or ordinary split bearings, and the friction thrust-collar will then preferably be made integral with the screw; or, if the journals of the screw are turned smaller than the thread thereof, a suitable thrust-collar might thereby be conveniently provided, consisting of one of the shoulders thus formed by turning into the screw; or a groove may be turned in the screw to form a thrust-collar, the fixed part which receives the screw being in each case correspondingly formed to fit the thrust-collar of the screw.

It is immaterial what the shape of the head of the screw is, so long as it contains the recesses for the reception of the prongs on the end of the spring.

Where it is desirable to secure any rotatable part in any fixed position this combined operating-handle and clamp may be employed—as, for instance, upon the arbor of a registering-dial or of a wheel which requires to be held in various positions. This folding spring operating-handle may also be applied to a nut, as well as to the head of a screw, where a bolt or nut has to be frequently removed from its place. Fig. 18 shows such construction, the bolt $r$ being secured through two flanges, $s$ $s$, for coupling them together. The nut $t$ is formed with the recesses $t^2$ to receive the spring J, and the head $t^5$ of the bolt forms the thrust-collar, which is pressed against the flange $s$ by the spring J, thus producing the friction required, or, if the frictional element is not required, the spring acts as a device to hold the flanges $s$ together the same as a nut alone or an auxiliary jam or set nut.

When the recesses in the head of the screw are formed by drilling, they may be drilled in as far as the body of the bolt or arbor, or the drill may be run clear through the screw, thus forming one recess only; also, the thread of the screw in the drawings may be made to fill the hole $h$ through the base of the sight, thus dispensing with the necessity of a journal for the nut $i$, the screw being in that case made to project through the base, with the nut $i$ bearing against the face of the base.

I therefore claim—

1. In mechanism operated or adjusted by a rotatable arbor or part, the combination of the arbor provided with a frictional thrust collar or flange and a head having a recess or recesses in its face extending from the periphery inward, the fixed bearing for receiving the arbor, and fixed faces or shoulders in juxtaposition with and corresponding to the working-faces of the arbor-head and the frictional thrust-collar, and an operating clamp-handle consisting, essentially, of a forked, looped, or U-shaped spring having its ends received or journaled and held in the recess or recesses of the arbor-head and adapted as the spring is swung around the recess as a pivotal point to press against the arbor-head, and corresponding fixed bearing to clamp the frictional thrust-collar to its seat or to bear against the sides of the recess to release the arbor, for the purpose specified.

2. In mechanism operated or adjusted by an adjusting-screw, the combination of the adjusting bolt or screw provided with journals, a frictional thrust-collar, and a collar or flange having recesses or slots in its face extending from the periphery inward toward the body of the screw, the fixed bearings for receiving the journal or journals of the screw, and faces or radial bearings corresponding to and in juxtaposition with the screw-head and thrust-collar, and a looped or U-shaped spring having each leg or part of its loop forked or bifurcated to swing over the screw-head and formed with an inwardly-projecting prong at each end of each fork adapted to be received in the recesses in the screw-head and bear against the sides thereof when the spring is vertically over the screw-head and to press between the screw-head and its fixed seat when the spring is folded down in the plane of the screw-head, thereby clamping the frictional collar to its seat to hold the screw stationary.

3. In mechanism operated or adjusted by an adjusting-screw, the combination of the adjusting-screw provided with journals, a frictional thrust-collar, and a head or flange having opposite recesses or slots extending from the periphery inward toward the body of the screw, the fixed bearings for receiving the journal or journals of the screw, and faces or radial bearings corresponding to and in juxtaposition with the working-faces of the screw-collars, and the looped or U-shaped springs arranged one on each side of the screw-head and joined by a connecting-web or tie part forming a handle and having at each end of each loop an inwardly-projecting prong or point, which prongs are adapted, when the springs are compressed, to be received in the recesses under the head of the screw and clamp the screw upon its frictional seat or release it therefrom as the handle is folded down in the plane of the screw-head, with the oppositely-acting prongs bearing, respectively, upon the screw-head and face of the screw-bearing, or is swung up vertically over the screw-head, with the prongs resting against the sides of the recesses, for the purpose specified.

4. In mechanism operated by a rotatable arbor or screw, the combination of the arbor provided with a friction-shoulder and a head having opposite recesses or slots in its face extending from the periphery inward and being enlarged back from the face of the head, fixed journal-bearings for receiving the arbor, and fixed shoulders corresponding to the face of the arbor-head and the friction-shoulder, and an operating clamp-handle consisting, essentially, of a double-looped spring having a loop fork or bight on each side of the arbor-head joined by a connecting-web, and the points of each loop being bent inward and received in the corresponding recess of the head, substantially in the manner and for the purpose specified.

5. In mechanism operated by an adjusting-screw, the combination of an adjusting-screw provided with journals, a frictional thrust-collar, and a head or flange having opposite recesses or slots $l$ on the under side thereof, fixed bearings $h$ $h^2$, for receiving the journals of the screw, and faces or radial bearings $h'$ $h^3$, corresponding with and contiguous to the bearing-shoulders of the screw, and a looped or U-shaped spring, J, having each leg or part of the loop forked or bifurcated to swing over the screw-head and formed with an inwardly-projecting prong or projection, $n$, on each end of each fork adapted to be received in the recesses of the screw-head, and whereby the tension of the spring is adapted to be exerted between the screw-head and a fixed bearing or upon the respective sides of the recesses as the handle is folded down in the plane of the screw-head or swung into a position vertical thereto, substantially in the manner and for the purpose specified.

6. In a wind-gage sight for fire-arms, the combination of the sight-base B, the conical eccentric A, having a circular rack on its periphery and seated in the base carrying the sight-post, the adjusting-screw $d$, journaled in the base of the sight with its threads intermeshing with the rack of the conical eccentric and provided with the friction collar or nut $i$, and the head $f$, having the recesses on its inner side, and the combined folding and clamping operating-handle consisting, essentially, of a flat looped spring, J, having each part of its loop forked or spread to admit the body of the screw-head, and formed with an inwardly-extending prong or projection, $n$, on each end of each part of the loop, which projections are received in the recesses in the screw-head, whereby the operating-handle may be turned on the prongs as a journal and swung from a position at right angles to the screw-head down into the plane thereof to release or clamp the screw, substantially in the manner and for the purpose specified.

WILLIAM LYMAN.

Witnesses:
LYMAN A. MILLS,
ISADELL L. COOK.